US011470768B1

(12) United States Patent
Jackson et al.

(10) Patent No.: US 11,470,768 B1
(45) Date of Patent: Oct. 18, 2022

(54) PORTABLE SPRINKLER DEVICE

(71) Applicants: Charlie Jackson, Palmetto, GA (US); Jacquelin Jackson, Palmetto, GA (US)

(72) Inventors: Charlie Jackson, Palmetto, GA (US); Jacquelin Jackson, Palmetto, GA (US)

(*) Notice: Subject to any disclaimer, the term of this patent is extended or adjusted under 35 U.S.C. 154(b) by 294 days.

(21) Appl. No.: 16/870,313

(22) Filed: May 8, 2020

(51) Int. Cl.
*A01C 23/04* (2006.01)
*A01G 25/16* (2006.01)
*A01G 25/09* (2006.01)
*A01C 23/00* (2006.01)
*B05B 3/10* (2006.01)
*B01F 25/31* (2022.01)

(52) U.S. Cl.
CPC .......... *A01C 23/042* (2013.01); *A01C 23/007* (2013.01); *A01C 23/047* (2013.01); *A01G 25/09* (2013.01); *A01G 25/16* (2013.01); *B01F 25/31* (2022.01); *B05B 3/1057* (2013.01)

(58) Field of Classification Search
CPC ... A01C 23/042; A01C 23/007; A01C 23/047; B01F 25/31; A01G 25/09; A01G 25/16; B05B 3/4057
USPC ......... 239/69, 273, 275, 276, 279, 289, 242, 239/310, 313, 315
See application file for complete search history.

(56) References Cited

U.S. PATENT DOCUMENTS

| | | | | | |
|---|---|---|---|---|---|
| 2,622,928 | A | * | 12/1952 | Misch | B05B 3/06 239/310 |
| 3,260,464 | A | * | 7/1966 | Harant | B05B 7/30 239/310 |
| 5,096,123 | A | * | 3/1992 | Petitgoue | B05B 7/2443 239/310 |
| 5,150,840 | A | * | 9/1992 | Grynkiewicz | A01M 7/0092 239/310 |
| 5,419,494 | A | * | 5/1995 | Harwood | B05B 15/622 239/276 |
| 5,549,248 | A | | 8/1996 | Baker et al. | |
| 5,816,502 | A | * | 10/1998 | Sperry | A01C 23/042 239/310 |
| 6,161,779 | A | * | 12/2000 | Oyler | A01C 23/042 239/310 |
| 7,207,503 | B1 | * | 4/2007 | Stengel | A01G 25/09 239/315 |
| 7,789,321 | B2 | | 9/2010 | Hitt | |
| 2017/0326572 | A1 | * | 11/2017 | Goerdt | A01K 15/021 |
| 2020/0267915 | A1 | * | 8/2020 | Ferras | G05B 19/042 |

* cited by examiner

*Primary Examiner* — Steven J Ganey
(74) *Attorney, Agent, or Firm* — Sanchelima & Associates, P.A.; Christian Sanchelima; Jesus Sanchelima

(57) ABSTRACT

A portable sprinkler device is disclosed herein. The portable sprinkler device is configured to deliver a personalized combination of water, weed killer, lawn fertilizer, and insect control serum. The device may include a wireless control unit capable of communicating with a user interface. The wireless control unit may be configured as a Bluetooth-ready device. The user interface may further include a base station or other portable electronic device. The device is useful for delivering a combined liquid-based lawn treatment solution in a user-friendly manner.

10 Claims, 4 Drawing Sheets

PORTABLE SPRINKLER DEVICE

BACKGROUND OF THE INVENTION

1. Field of the Invention

The present invention relates to sprinkler device and, more particularly, to a portable sprinkler device that sprays a personalized combination of water, weed killer, lawn fertilizer, and insect control serum.

2. Description of the Related Art

Several designs for a sprinkler device have been designed in the past. None of them, however, include a portable sprinkler device configured to deliver a personalized combination of water, weed killer, lawn fertilizer, and insect control serum. The device may include a wireless control unit capable of communicating with a user interface. The wireless control unit may be configured as a Bluetooth-ready device. The user interface may include a base station or other portable electronic device. The device is useful for delivering a combined liquid-based lawn treatment solution in a user-friendly manner. It is known that individuals often have need of properly providing effective treatment to their lawn in order to keep it healthy. This may include providing a lawn with an effective combination of water, weed, killer, lawn fertilizer, and insect control serum. Applying all of these elements individually has proven to be a tedious and ineffective process that may lead to poor lawn health. Therefore, there is a need for a portable sprinkler device that allows a user to effectively provide all of these treatments to their lawn simultaneously. As a result, a user may save on time and money. Additionally, the present invention allows for a user to control the amount of solution that is sprayed on their lawn through their mobile device. The user has the flexibility of providing the desired treatment in order to achieve their desired lawn growth and health.

Applicant believes that a related reference corresponds to U.S. Pat. No. 7,789,321 issued for a wireless sprinkler control. The cited disclosure includes a system and method to control the flow duration and the flow rate of each individual sprinkler head wirelessly in each zone of an automatic sprinkler system. Applicant believes another related reference corresponds to U.S. Pat. No. 5,549,248, issued for a lawn feeder and sprinkler device. The cited disclosure includes a combination lawn feeder and sprinkler device that includes a fluid container formed in a generally cylindrical configuration. However, these references differ from the present invention because they fail to disclose the novel features of a portable sprinkler system having integrated liquid lawn feeder, watering, fertilizer, insect control, weed control and wireless controls in a functional combination. The present invention addresses these issues by combining all of these elements of lawn care treatment into a single device for a user's convenience. Additionally, the present invention allows the sprinkler to be controlled through a user's mobile device. Thereby giving the user flexibility in the amount of solution that is used for their lawn.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable sprinkler device that combines various methods of lawn care treatment into one easy to use and effective device.

It is another object of this invention to provide a portable sprinkler device that provides an effective lawn care treatment to maintain a proper and healthy lawn.

It is still another object of the present invention to provide a portable sprinkler device that is configured to be controlled by a user's mobile device and allows the user to control the amount of solution that is being provided to their lawn.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
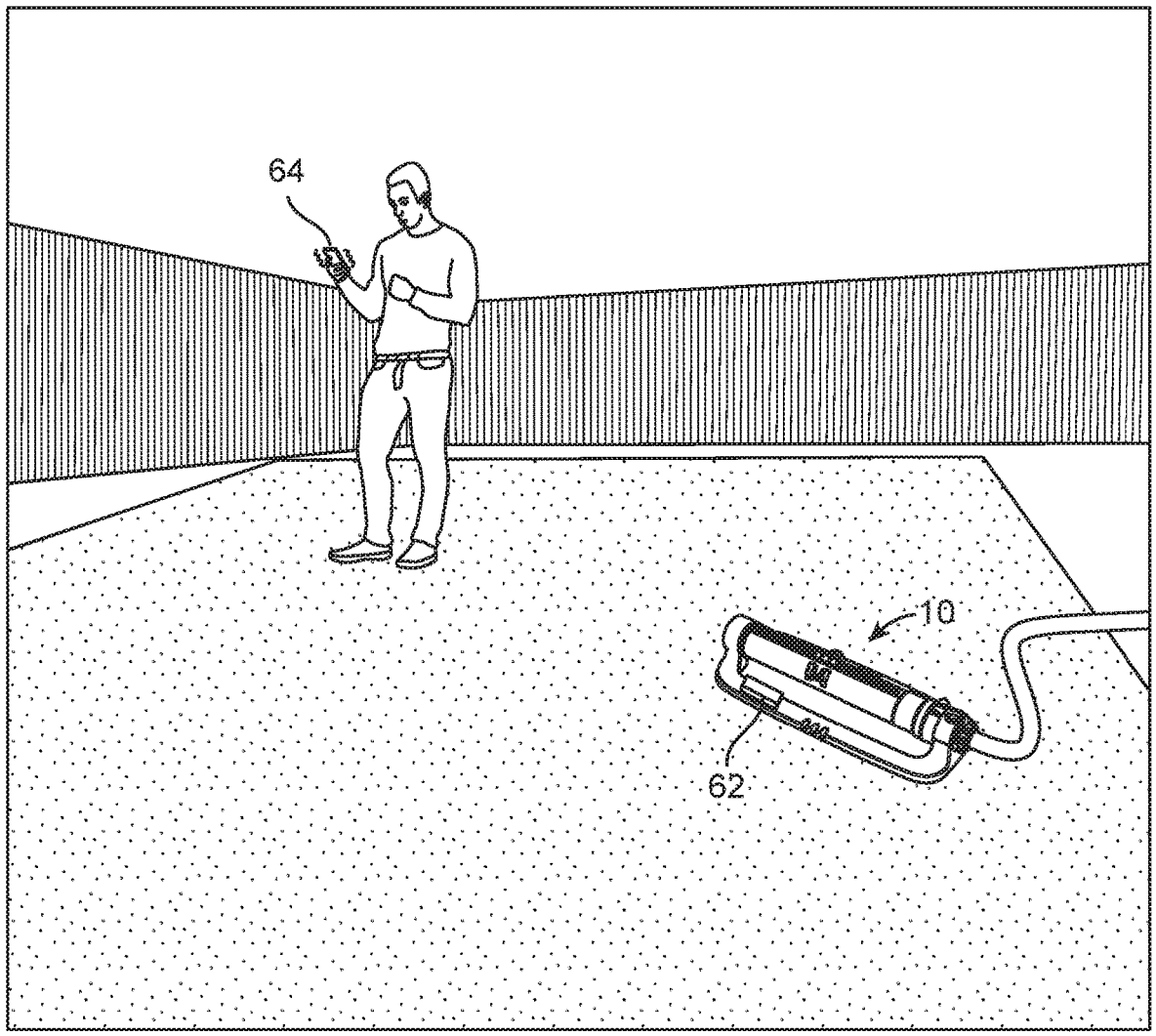
FIG. 1 represents an operational view of portable sprinkler device 10 placed on a user's lawn in accordance to an embodiment of the present invention.
Figure 2:
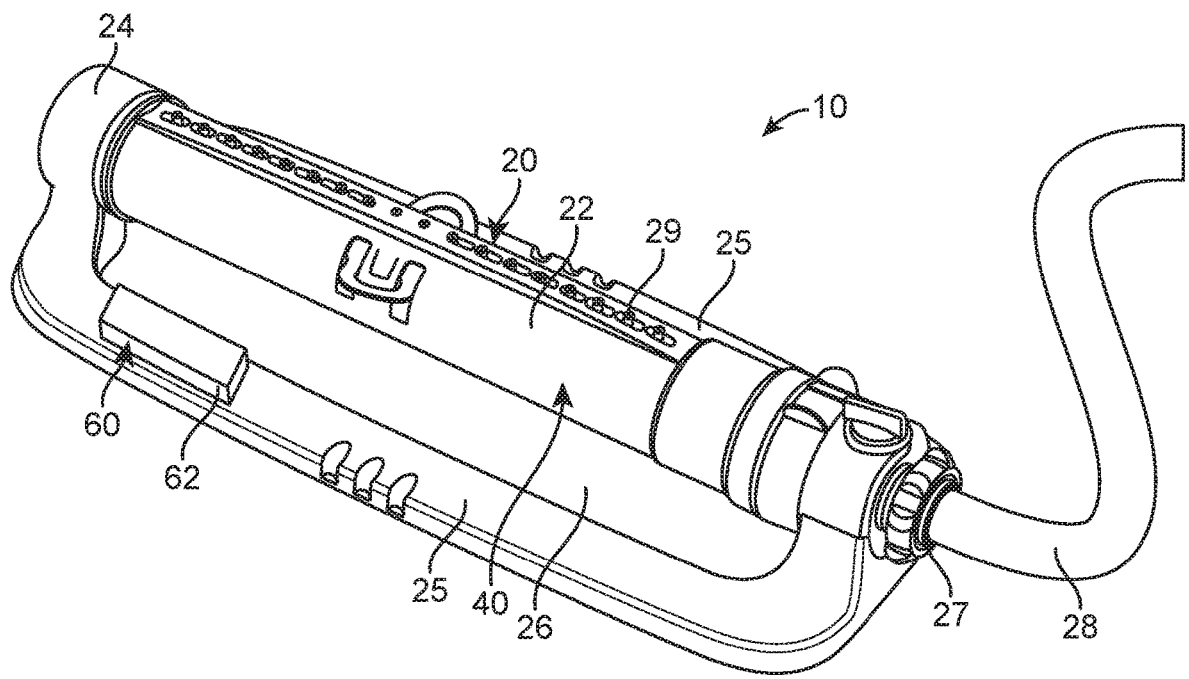
FIG. 2 shows an isometric view of sprinkler device 10 depicting components of sprinkler assembly 20 in accordance to an embodiment of the present invention.
Figure 3:
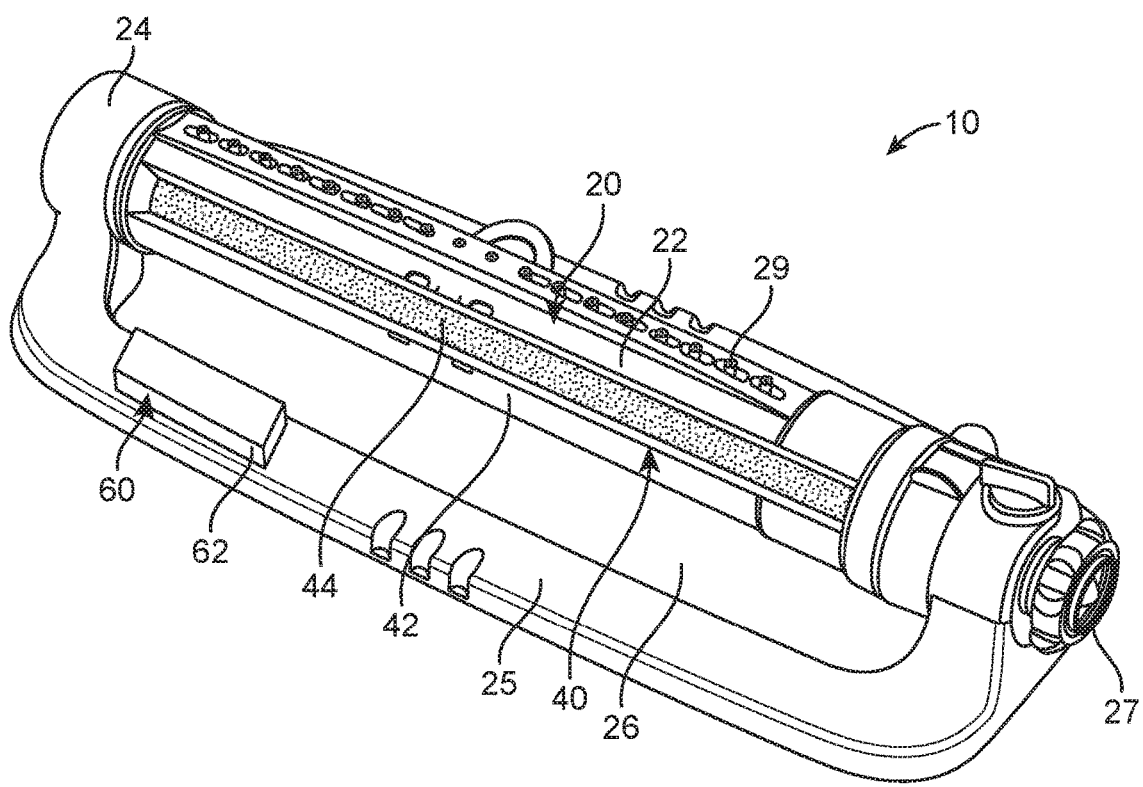
FIG. 3 illustrates an isometric internal view of sprinkler device 10 depicting components of solution assembly 40 in accordance to an embodiment of the present invention.
Figure 4:
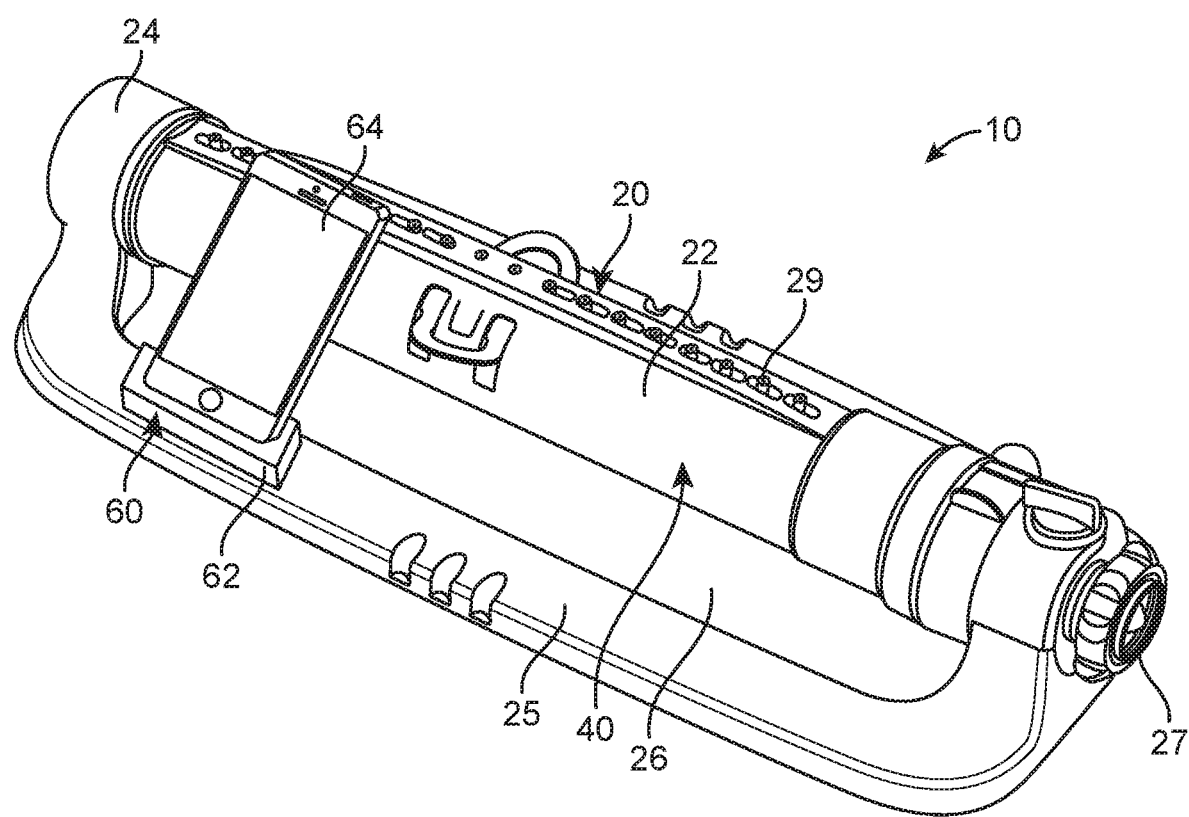
FIG. 4 is a representation of an isometric view of sprinkler device 10 depicting communication assembly 60 in accordance to an embodiment of the present invention.
Figure 5:
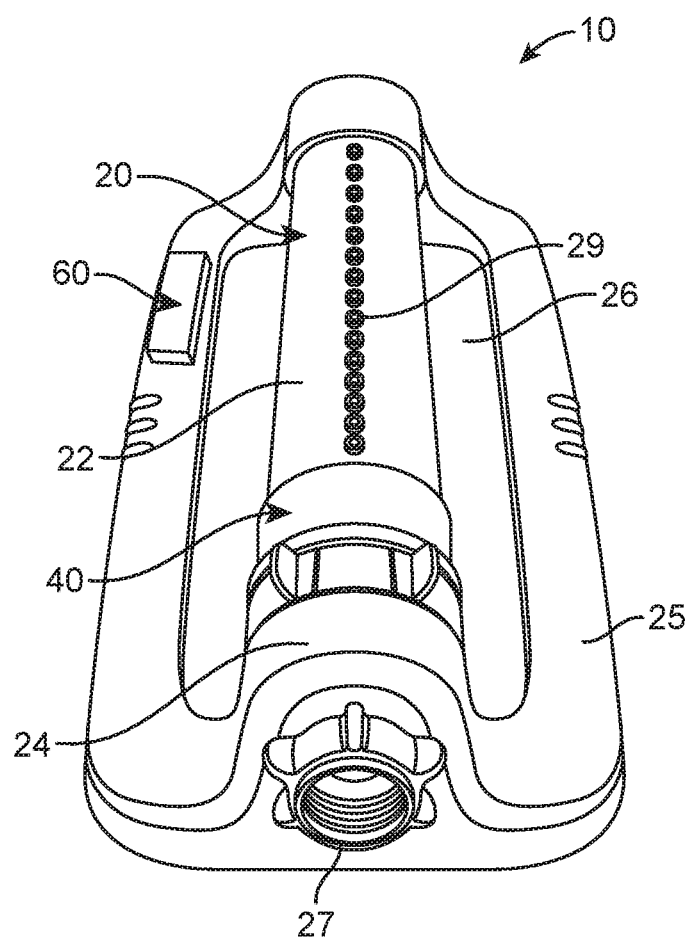
FIG. 5 shows an isometric side view of sprinkler device 10 in accordance to an embodiment of the present invention.

Referring now to the drawings, where the present invention is generally referred to with numeral 10, it can be observed a portable sprinkler device 10 that basically includes a sprinkler assembly 20, a communication assembly 40, and a communication assembly 60.

Sprinkler assembly 20 includes a sprinkler member 22 mounted onto a base 24. In one embodiment, sprinkler member 22 is cylindrical sprinkler member that is mounted in a vertical position along base 24. However, any variation of sprinkler may be used for sprinkler member 22 and is not limited to being a cylindrical sprinkler member. Other variation of sprinkler members includes vertical sprinklers and curved sprinklers that may be staked into a lawn. Additionally, sprinkler member 22 may be of the oscillating variety in order to cover the maximum area of a user's lawn. Base 24 may also be made of any suitable material such as aluminum, plastic, and the like. In the present embodiment, base 24 is placed on a ground surface, specifically, a user's lawn. In one embodiment, base 24 includes handles 25. Furthermore, handles 25 are separated by a middle opening 26. In one embodiment, base 24 is located entirely below sprinkler member 22. Base 24 may also include a circular attachment member that couples to one end of sprinkler member 22 to create a secure attachment. Additionally, sprinkler member 22 may be of the oscillating variety, thereby allowing the sprinkler to cover a maximum area of a user's lawn. However, the oscillating component is not required for the present invention, a stationary sprinkler member may also be used. Sprinkler member 22 further includes a hose opening 27 that receives a hose 28 configured to supply water therein. In one embodiment, hose opening 27 is located along a sidewall of sprinkler member 22. Other embodiments may feature hose opening 27 on difference locations of sprinkler member 22. As known in the art of hoses, hose opening 27 may be a circular member with inner threading to receive hose 28. Sprinkler member 22 further includes sprinkler openings 29 located on a top end of sprinkler member 22. In one embodiment, sprinkler openings 29 are positioned vertically along a top end of sprinkler member 22. The described sprinkler assembly 20 is only one embodiment of the sprinkler that may be used for the present invention.

Solution assembly 40 includes a chamber 42 housed entirely within sprinkler member 22 and containing a solution 44 therein. In one embodiment, chamber 42 is a semi-cylindrical member located within sprinkler member 22. Additionally, chamber 42 may extend the entire length of sprinkler member 22. Other embodiments may feature configurations of chamber 42 having different shapes and located along different locations within sprinkler member 22. In one embodiment, solution 42 is a liquid based lawn treatment solution that is optimized to maintain a proper and healthy lawn. In a preferred embodiment, solution 44 includes a combination of water, weed killer, lawn fertilizer, and an insect control serum. The amount of each element may be entirely dependent on the user and may be customized to the user's desired lawn care. Additionally, the lawn fertilizer used may be an organic based lawn fertilizer. In another embodiment, the lawn fertilizer used may be a synthetic based chemical fertilizer. Furthermore, various versions of weed killer and insect control may be used. In a preferred embodiment, the weed killer and insect control used is a non-harmful chemical that is safe to use with animals. As water is supplied through hose opening 27 it travels into chamber 42. The water received therein is then mixed with the solution 44 therein. The mixed solution is then dispensed from sprinkler openings 29 to then be sprayed onto a user's lawn. The solution 44 aids a user in maintaining proper lawn care.

Communication assembly 60 includes a communication module 62 mounted directly onto handles 25 of sprinkler assembly 20. In a preferred embodiment, communication module 62 includes a Bluetooth system to allow a user to wirelessly connect a mobile device 64 to the sprinkler member 22. In another embodiment, mobile device 64 is directly mounted onto the communication module and does not need to be connected wirelessly. Once the mobile device is connected, a user may control various parameters of the sprinkler member 22. In one embodiment, a user controls the sprinkler rate and sprinkler amount of solution that is being sprayed by sprinkler member 22. In another embodiment, a user is able to actuate sprinkler member 22 in an active and inactive state through mobile device 64. Other features may include setting a timer for the sprinkler member 22 in the active state. A user may also set up a schedule through their mobile device of when the sprinkler device 10 should be activated. In another embodiment, mobile device 64 collects data from sprinkler device 10 and informs the user of various parameters within the sprinkler device 10. This may include alerts to the user when the sprinkler member 22 is running low on the solution needed to maintain a healthy lawn. Furthermore, this may also include alerts to a user notifying them that they are over-watering their lawn. Sprinkler device 10 provides a user with the most optimal and easy to use solution in maintaining a healthy lawn environment.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable sprinkler device, comprising:
   a. a sprinkler assembly including a sprinkler member mounted onto a base, said sprinkler member including a hose opening that receives a hose configured to supply water to said sprinkler member, said sprinkler member including a plurality of openings on a top end;
   b. a solution assembly including a chamber located entirely within said sprinkler member and contains a solution therein, wherein said solution is a combined liquid-based lawn treatment solution, wherein said solution includes a combination of water, weed killer, lawn fertilizer, and an insect control serum; and
   c. a communication assembly including a communication module mounted to said base, wherein said communication module includes a Bluetooth connection system, wherein a user connects a mobile device to said communication module to control parameters of said sprinkler member, said mobile device is directly and communicably mounted to said communication module.

2. The portable sprinkler device of claim 1 wherein said sprinkler member is a cylindrical sprinkler member.

3. The portable sprinkler device of claim 1 wherein said plurality of openings are positioned vertically along a top end of said sprinkler member.

4. The portable sprinkler device of claim 1 wherein said base includes two handles and an open middle portion between said two handles.

5. The portable sprinkler device of claim 1 wherein said sprinkler member is an oscillating sprinkler member.

6. The portable sprinkler device of claim 1 wherein said lawn fertilizer of said solution is an organic based lawn fertilizer.

7. The portable sprinkler device of claim 1 wherein said lawn fertilizer of said solution is a synthetic based chemical fertilizer.

8. The portable sprinkler device of claim 1 wherein said parameters include a sprinkler rate and a sprinkler amount of said sprinkler member.

9. The portable sprinkler device of claim 1 wherein a user actuates said sprinkler member into an active and an inactive state through said mobile device.

10. A portable sprinkler device, comprising:
    a. a sprinkler assembly including a sprinkler member mounted onto a base, wherein said sprinkler member is a cylindrical sprinkler member vertically along a middle portion of said base, wherein said base includes two handles separated by an opening located on said middle portion of said base, wherein said sprinkler member is an oscillating sprinkler members that rotates, said sprinkler member including a hose opening that receives a hose, said sprinkler member further including a plurality of openings adjacently positioned along a top end of said sprinkler member;

b. a solution assembly including a chamber containing a solution located within said sprinkler member, wherein said chamber is semi-cylindrical in shape, wherein said solution is a liquid based lawn treatment solution, said liquid based lawn treatment solution containing a combination of water, weed killer, lawn fertilizer, and an insect control serum, wherein water supplied through said hose openings flows through said chamber and is then dispensed through said plurality of openings; and c. a communication assembly including a communication module mounted onto said base, wherein a mobile device pairs to said communication module using Bluetooth connectivity, wherein said mobile device is directly mounted onto said communication module, wherein a user controls a sprinkler rate and a sprinkler amount through said mobile device, wherein a user actuates said sprinkler member into an active and an inactive state using said mobile device.

\* \* \* \* \*